United States Patent
Sindwani et al.

(10) Patent No.: US 12,541,687 B1
(45) Date of Patent: Feb. 3, 2026

(54) MACHINE LEARNING (ML) MODEL INFERENCE PROCESS SELECTION FOR ML MODEL DEPLOYMENT

(71) Applicant: Amazon Technologies, Inc., Seattle, WA (US)

(72) Inventors: Karan Sindwani, Sunnyvale, CA (US); Vidya Sagar Ravipati, San Jose, CA (US); V Divya Bhargavi, Sunnyvale, CA (US)

(73) Assignee: Amazon Technologies, Inc., Seattle, WA (US)

( * ) Notice: Subject to any disclaimer, the term of this patent is extended or adjusted under 35 U.S.C. 154(b) by 859 days.

(21) Appl. No.: 17/809,515

(22) Filed: Jun. 28, 2022

(51) Int. Cl.
*G06N 3/082* (2023.01)

(52) U.S. Cl.
CPC .................... *G06N 3/082* (2013.01)

(58) Field of Classification Search
CPC ...................................... G06N 20/00
See application file for complete search history.

(56) References Cited

U.S. PATENT DOCUMENTS

| | | | |
|---|---|---|---|
| 2015/0379426 A1* | 12/2015 | Steele | G06N 5/025 706/12 |
| 2022/0044149 A1 | 2/2022 | Rand et al. | |

* cited by examiner

*Primary Examiner* — Eric Nilsson
(74) *Attorney, Agent, or Firm* — Robert C. Kowert; Kowert, Hood, Munyon, Rankin & Goetzel, P.C.

(57) ABSTRACT

A model deployment tuning system (MDTS) receives a trained ML model, specified constraints, and model evaluation data and applies a plurality of model utilization techniques to the trained ML model to produce a plurality of useable model versions of the trained ML model. The MDTS executes each of the plurality of useable model versions of the trained ML models on a plurality of different compute instance types using the model evaluation data to produce model evaluation results for a plurality of different combinations. The MDTS filters the model evaluation results based on the specified constraints to indicate one or more of the different combinations satisfying the specified constraints. The MDTS deploys one of the plurality of useable model versions of the trained ML model to a compute instance types according to a selected combination satisfying the specified constraints.

20 Claims, 10 Drawing Sheets

MACHINE LEARNING (ML) MODEL INFERENCE PROCESS SELECTION FOR ML MODEL DEPLOYMENT

BACKGROUND

Many modern computing applications employ machine learning algorithms and models. Machine learning models, which typically include numerous hidden neural network layers at which values of thousands (or even millions) of model parameters are learned, have been used in a wide variety of application domains including object recognition, text analysis, video analysis, game playing, time series prediction and the like. However, machine learning models could be memory intensive and computationally expensive requiring large and costly GPUs, hindering their deployment in devices with low memory resources, applications with strict latency requirements or cost considerations. Identifying and selecting a suitable inference process for deploying a particular machine learning model to execute requested machine learning tasks may sometimes take a non-trivial amount of time.

Figure 1:
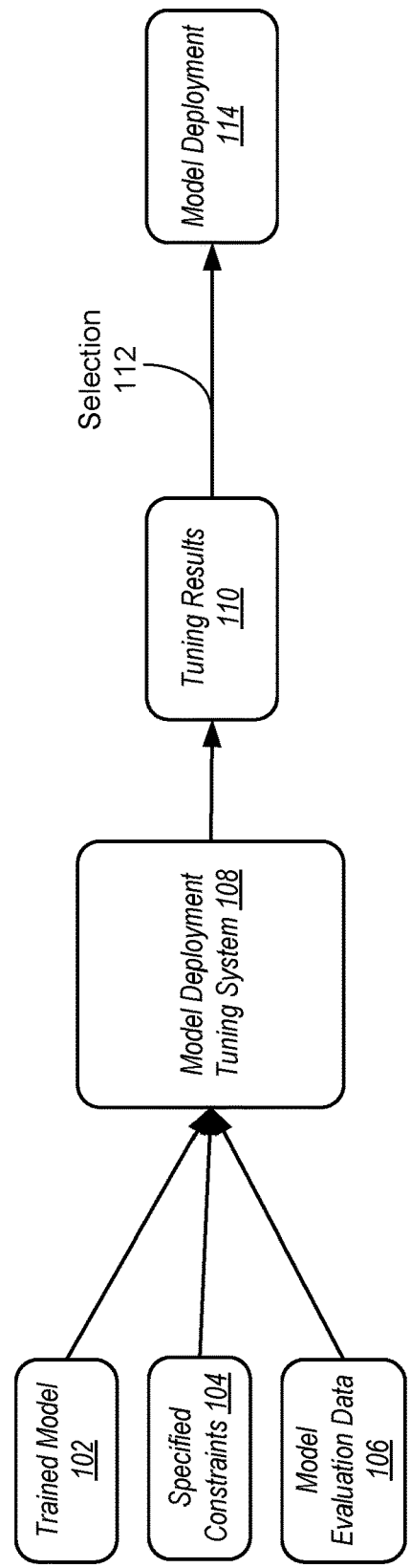
FIG. 1 illustrates an example system environment for which trained machine learned (ML) models, specified constraints, and evaluation scripts and data are provided for tuning trained models and selecting utilization techniques and compute instance types for deploying the trained ML models for machine learning tasks, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

The present disclosure relates to methods and systems for creating efficient inference workloads for machine learning models. Using model utilization techniques (e.g., model compression) and the identification of suitable cloud and edge resources for inference, visibility into bottlenecks may be offered across a plurality of resource configurations within a network and to allow users to make informed decisions when designing ML pipelines. A model deployment tuning system (MDTS) may identify efficient ML model utilization techniques and suitable compute instance types for a particular inference task to minimize cost, reduce inference latency, and identify suitable memory while maintaining comparable model performance. By providing a trained ML model, specified constraints, and model evaluation data, ML developers may use the MDTS to identify suitable inference processes from a plurality of suitable model utilization technique and compute instance type combinations prior to deployment.

A machine learning (ML) service enables ML developers and data scientists to create efficient inference workloads. A model deployment tuning system (MDTS), as described herein, may determine/find/identify suitable model efficiency (e.g., optimize) trained ML models through model utilization techniques (e.g., model compression techniques), identify suitable cloud devices and/or edge devices for inference, and may provide visibility into bottlenecks across all possible device configurations available in a provider network, so that customers can make an informed decision when designing ML pipelines. The MDTS, implemented with a provider network may manage existing inference capabilities by reducing the time and effort involved in benchmarking inference pipelines across multiple model utilization techniques and device configuration types and may empower customers with more information to select a suitable (e.g., optimal) model optimization strategy and an instance that meets the customer's inference pipeline objectives.

Deep Neural Networks (DNN) while having many real world applications, may be memory intensive and computationally expensive requiring large and costly GPUs, and thus, hindering their deployment in devices with low memory resources, applications with strict latency requirements, and/or cost considerations. In some aspects, building an efficient inference pipeline may involves experimenting with various model utilization strategies, hardware devices, or hardware specific model utilization methods. Model utilization techniques (e.g., model optimization techniques) like model compression may reduce inference latency and cost by reducing model size with little degradation in model performance. Concepts like model utilization and model compression can be highly advanced for some ML practitioners, blocking those practitioners from exploring these options all together. For practitioners, iterating through a plurality of different utilization techniques like quantization, pruning, weight clustering, and the like suitable for given target hardware as well as deploying them to measure model performance, inference latency, and/or cost may be an onerous task. With provider network device farms offering a wide selection of cloud instances and/or edge instances with varying combinations of CPU, GPU, memory, storage, operating system (OS) and networking capacity, customers currently may not know how their target inference device compares against others and may not have visibility into alternate device configurations and corresponding utilization techniques suitable or more suitable for their inference pipeline considerations. In some aspects, currently, customers may be forced to do a trial-and-error process, slowing down experimentation and deployment processes.

The MDTS, as described herein, may reducing processing time for identifying suitable or more suitable resource combinations for the fundamental units of inference pipelines-trained model and the inference instance itself, prior to deployment. Inputs that may be used or received by the MDTS to perform the operations described herein may include, for example, a trained model and list of target inference instances across various platforms in the cloud and at the edge. The MDTS may determine suitable or more suitable utilization technique and compute instance type combinations through a two-step process of model utilization (e.g., model compression) and suitable compute instance identification. For example, the MDTS may reduce the model size tailored for various deep learning tasks and frameworks and deploy the compressed models across compute instance types, perform inference, and output a comprehensive report of model compression techniques used, path to the compressed model generated, its corresponding inference time, model memory size, CPU/GPU utilization on selected instance types. In some aspects, customers may create an inference utilization job by providing a path of the trained ML model and select target compute instances or instance types from a list of supported instances. In some cases, the MDTS may output an inference benchmark report as a table on a console, as well as a file path for the same.

In some aspects, the MDTS may be implemented by ML engineers to find suitable or more suitable computer models and identify low-cost instances for edge deployments. For example, by having a suitable model running on a mobile device, a radiologist may have access to enhanced MRIs from low resolution ones with low latency and minimal data transfer. The MDTS may swiftly identify the most suitable model utilization technique for particular models best suited for preferred edge devices configurations and without significant loss in model performance. The MDTS may generate a report that is highly comprehensive and provides useful information concerning latency versus model size trade off (e.g., reducing cost while improving latency), bottle necks in CPU, GPU utilization, and/or the like across several device configuration types reducing cost while improving latency.

FIG. 1 illustrates an example system environment 100 for which trained machine learned (ML) models, specified constraints, and evaluation scripts and data are provided for tuning trained models and selecting utilization technique and compute instance type combinations for deploying the trained ML models for machine learning tasks, according to at least some embodiments. As shown, system environment 100 includes a trained model or trained ML model 102, one or more specified constraints 104, and model evaluation data 106. The model deployment tuning system (MDTS) 108 receives the trained ML model 102, the specified constraints 104, and the model evaluation data. The model evaluation data may include at least one of a model evaluation script, model test data, or model verification data. The model evaluation script may be executable to provide the model test data to the trained ML model and compare inference outputs from the trained ML model to the model verification data to evaluate an accuracy of the trained ML model. In some aspects, the model evaluation data may include data from one or more previously run trained ML models. In some aspects, the model evaluation data my include metadata (e.g., may be limited to metadata) from one or more previously run trained ML models. In some aspects, the model evaluation data may include synthetically manufactured data (e.g., metadata) for running trained ML models on the MDTS. In some aspects, the model evaluation data may include evaluation data (e.g., metadata) provided by an owner and/or developer of the trained ML model.

The specified constraints may include one or more model accuracy constraints, one or more model precision constraints, one or more model inference latency constraints, one or more model memory throughput constraints, a module compression size constraint, one or more a model CPU utilization constraint, or one or more model GPU utilization constraints. Additionally, or alternatively, the specified constraints 104 may include a constraint on the types of computer instances on which the trained ML model may be run and/or a constraint on the types of utilization techniques that may be implemented with the trained model. Upon receiving the trained ML model 102, the specified constraints 104, and the model evaluation data, the MDTS 108 may run a plurality of model utilization technique and compute instance type combinations and output model evaluation results 110. The MDTS 108 may receive a selection 112 of one of the plurality of model utilization technique and compute instance type combinations and deploy 114 the trained ML model in accordance with the selection.

The model evaluation data 106 may be data used to execute the trained ML model on a plurality of different compute instance types using a plurality of different utilization techniques. In some aspects, the model evaluation data may comprises at least one of a model evaluation script, model test data, or model verification data. For example, the MDTS may execute the model evaluation script to provide the model test data to the trained ML model and compare inference outputs from the trained ML model to the model verification data to determine one or more model evaluation results of the trained ML model. In some aspects, the model evaluation results may include a constraint on the types of computer instances on which the trained ML model may be run, a model accuracy level (e.g., a qualitative value, a quantitative value or value range), a model precision level, a model inference latency level, a model throughput level, a model memory utilization level, a model CPU utilization level, a model GPU utilization level, or the like.

According to at least some embodiments, a provider network may include a plurality of compute instances established in response to a client request. The compute instances may include computing resources of several different categories or compute instance types, where the resources in the different compute instance types have different resource capacities (e.g., different numbers of virtual or physical CPUs, different amounts of memory or storage space, different networking capacity, etc.). Respective sets of parameters (e.g., specified constraints) may be provided for an ML model tuning process to identify and/or select specific compute instance types for ML model deployment.

Various network-accessible services may be implemented at one or more data centers of the provider network in different embodiments. Network-accessible computing services can include an elastic compute cloud service (referred to in various implementations as an elastic compute service, a virtual machines service, a computing cloud service, a compute engine, or a cloud compute service). This service may offer compute instances of the kind discussed herein (also referred to as virtual machines, or simply "instances") with varying computational and/or memory resources, which are managed by a compute virtualization service (referred to in various implementations as an elastic compute service, a virtual machines service, a computing cloud service, a compute engine, or a cloud compute service). In one embodiment, as discussed herein, each of the virtual compute instances may correspond to one of several instance categories, types or families. An instance type may be characterized by its hardware type, computational resources (e.g., number, type, and configuration of central processing units (CPUs or CPU cores), memory resources (e.g., capacity, type, and configuration of local memory), storage resources (e.g., capacity, type, and configuration of locally accessible storage), network resources (e.g., characteristics of its network interface and/or network capabilities), and/or other suitable descriptive characteristics (such as being a "burstable" instance type that has a baseline performance guarantee and the ability to periodically burst above that baseline, or a non-burstable or dedicated instance type that is allotted and guaranteed a fixed quantity of resources). Each instance type can have a specific ratio of processing, local storage, memory, and networking resources, and different instance families may have differing types of these resources as well. Multiple sizes of these resource configurations can be available within a given instance type. A suitable host for a requested instance type can be selected based at least partly on factors such as collected network performance metrics, resource utilization levels at different available hosts, and so on.

Determining how to utilize or compress a neural network or other machine learning model is also not without cost. Thus, the techniques described in various embodiments to identify compression profiles and compression policies to produce those compression profiles across similar network architectures may be implemented to decrease the cost (e.g., reduce time, making the compression faster) to apply compression. For example, channel pruning may be one type of neural network compression that may be implemented in various embodiments, where the number of channels in each layer of a neural network is reduced. In some embodiments, a channel pruning algorithm may determine a number of channels to prune in each layer and which channels to prune in each layer. Instead of implementing iterative techniques that are time and resource intensive to determine the number and which channels to prune, fast network compression can be achieved from the application of pre-defined compression profiles that are specific to a network architecture (or similar network architectures) to quickly make compression decisions, such as how much to prune in each layer of a neural network, in various embodiments. Since the compression profiles may be applicable to any trained network of the same architecture, using these profiles can provide a high accuracy for the corresponding compression without utilize expensive and iterative analysis and instead provide a single-pass technique to compress a neural network. Moreover, using compression profiles in this way can reduce time taken for compression, as analysis may not be needed on the trained neural network. The deployment of compression techniques may also be simplified as a compression system may not need to compute complicated metrics (such as gradient, etc.) from the neural network. In other embodiments, other techniques can be utilized to select which features to remove, such as max-metric, learned, or online techniques.

Figure 2:
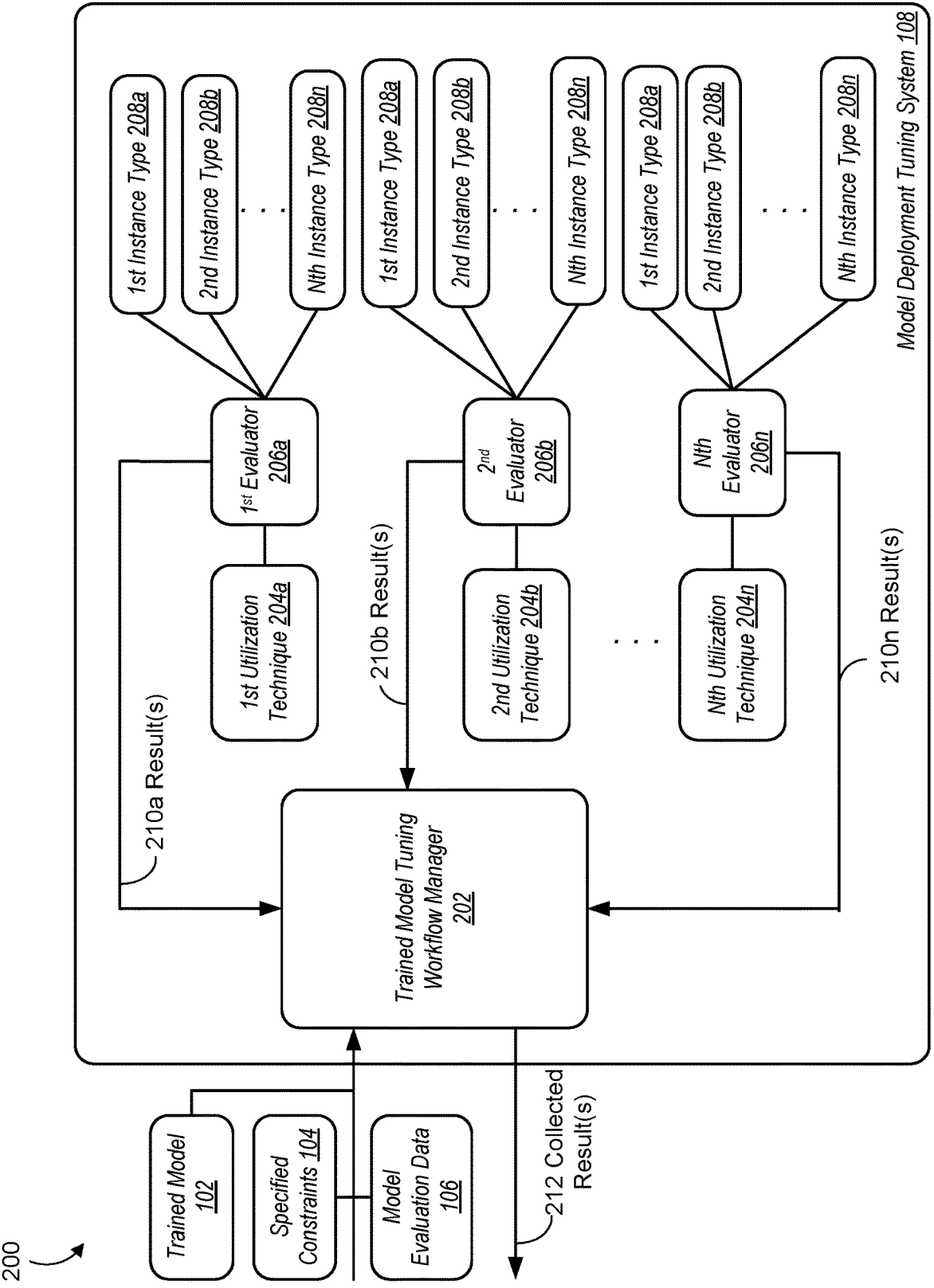
FIG. 2 illustrates an example environment including a model deployment tuning system for tuning trained models and selecting utilization techniques and compute instance types to determine model evaluation results for the deployment of trained ML models, according to at least some embodiments.

FIG. 2 illustrates an example environment 200 including a model deployment tuning system (MDTS) 108 for tuning trained models and selecting utilization techniques and compute instance types to determine model evaluation results for the deployment of trained ML models, according to at least some embodiments. As shown in FIG. 2, the MDTS 108 may include trained model tuning workflow manager 202, a plurality of utilization techniques including a first utilization technique 204a, a second utilization technique 204b, through an Nth utilization technique 204n. The MDTS 104 may also include a plurality of evaluators including a first evaluator 206a, a second evaluator 206b, and through an Nth evaluator 206n. Each of the utilization techniques may be associated with a evaluator. For example, the first utilization technique 204a may be associated with the first evaluator 206a, the second utilization technique 204b may be associated with the second evaluator 206b, and the Nth utilization technique 204n may be associated with the Nth evaluator 206n.

Upon receiving a trained ML model 102, one or more specified constraints 104, and model evaluation data 106, the trained model tuning workflow manager 202 may initiate the evaluators to run the trained ML model 102 implemented with a model utilization technique and implemented on a plurality of different compute instance types using the model evaluation data 106 and the specified constraints 104. For example, the trained model tuning workflow manager 202 may initiate the first evaluator 206a to implement the first utilization technique 204a on the trained ML model 102 and execute the trained ML Model 102 on a plurality of instance types including a first instance type 208a, a second instance type 208b, and through an Nth instance type 208n. Similarly, the trained model tuning workflow manager 202 may initiate the second evaluator 206b to implement the second utilization technique 204b on the trained ML model 102 and execute the trained ML Model 102 on the plurality of instance types including the first instance type 208a, the second instance type 208b, and through the Nth instance type 208n. Further, the trained model tuning workflow manager 202 may initiate the Nth evaluator 206n to implement the Nth utilization technique 204n on the trained ML model 102 and execute the trained ML Model 102 on the plurality of instance types including the first instance type 208a, the second instance type 208b, and through the Nth instance type 208n. In some aspects, the trained model tuning workflow manager 202 may initiate every evaluator to implement every utilization technique and execute each useable version of the trained ML model from each utilization technique on every instance type. In some aspects, the specified constraints and historical evaluation data (e.g., stored with or accessible by the trained model tuning workflow manager 202) may eliminate one or more utilization techniques and/or one or more instance types thereby reducing the number of combinations of utilization techniques and instances types by which the trained ML Model 102 may be executed.

In response to the trained model tuning workflow manager 202 initiating each of the evaluators to run the trained ML model with each of the utilization technique and instance type combinations, each of the evaluators may run the trained ML model with each of the utilization technique and instance type combinations and provide model evaluations results to the trained model tuning workflow manager 202. For example, the first evaluator 206a may provide model evaluation results 210a to the trained model tuning workflow manager 202, the second evaluator 206b may provide model evaluation results 210b to the trained model tuning workflow manager 202, and the Nth evaluator 206n may provide model evaluation results 210n to the trained model tuning workflow manager 202.

In some aspect, upon receiving the model evaluation result(s) 210a, 210b, and 210n, the trained model tuning workflow manager 202 may collect the mode evaluation data into collected model evaluation results 212. For example, the trained model tuning workflow manager 202 may collect the model evaluation results 210a, 212b, and 210n for respective executed useable versions of the trained ML model for each compute instance type. For each useable version of the trained ML model and compute instance type combination, the trained model tuning workflow manager 202 may collect the recorded model evaluation results into a matrix or table. For each useable version of the trained ML model and compute instance type combination, the trained model tuning workflow manager 202 may collect one or more of a model accuracy level (e.g., a qualitative value, a quantitative value or value range), a model precision level, a model inference latency level, a model throughput level, a model memory utilization level, a model CPU utilization level, a model GPU utilization level, and/or the like into a matrix or table and correlate the respective levels with the respective combinations.

Subsequently, the trained model tuning workflow manager 202 may filter the collected one or more model evaluation results for the respective executed usable versions of the trained ML model based on the one or more specified constraints to indicate one or more of the combinations of the useable versions of the trained ML model and the different instance types satisfying the one or more specified constraints. For example, upon collecting one or more of the model accuracy level (e.g., a qualitative value, a quantitative value or value range), the model precision level, the model inference latency level, the model throughput level, the model memory utilization level, the model CPU utilization level, the model GPU utilization level, and/or the like into the matrix or table, for each of the respective combinations and correlating the respective levels with the respective combinations, the trained model tuning workflow manager 202 may filter the model evaluation results 212. In some aspects, the trained model tuning workflow manager 202 may filter the model evaluation results by ranking the model evaluation results according to the one or more specified constraints. In some cases, the trained model tuning workflow manager 202 may then select a top-ranked combination from the plurality of useable model versions and the plurality of different compute instance types for deployment. In some aspects, the trained model tuning workflow manager 202 may filter the model evaluation results based on which utilization technique and instance type combinations for the trained ML model have a highest or a lowest model accuracy level, model precision level, model inference latency level, model throughput level, model memory utilization level, model CPU utilization level, model GPU utilization level, and/or the like. In some aspects, the trained model tuning workflow manager 202 may filter the model evaluation results 212 based on which utilization technique and instance type combinations for the trained ML model have a highest or a lowest level for a first model evaluation result (e.g., model throughput level) while maintaining a second (and different) model evaluation result (e.g., a model accuracy level) above or below a threshold. Before and/or after filtering, the model evaluation results 212 may presented to a user via a user interface (e.g., a user interface on a device owned by the user). In some aspects, a user, via a user interface, may have a slide bar to adjust the threshold of the second model evaluation result to determine which utilization technique and instance type combinations are filtered for the trained ML model and the respective first model evaluation result when the threshold for the second model evaluation result changes.

The trained model tuning workflow manager 202 may then select a useable version of the trained ML model and an instance type combination of the one or more combinations of the useable versions of the trained ML model and the different instance types satisfying the one or more specified constraints. For example, upon filter the model evaluation results 212, the trained model tuning workflow manager 202 may receive a selection of a utilization technique and instance type combination for the trained ML model. In some aspects, the trained model tuning workflow manager 202 may select a useable version of the trained ML model and an instance type combination that a highest or lowest model accuracy level, model precision level, model inference latency level, model throughput level, model memory utilization level, model CPU utilization level, model GPU utilization level, and/or the like. In some aspects, the trained model tuning workflow manager 202 may select a useable version of the trained ML model and an instance type combination having a level that is highest or lowest for a first model evaluation result when a second model evaluation result is above or below a threshold (e.g., a predetermined threshold, a user-specified threshold). In some aspects, the trained model tuning workflow manager 202 may receive a selection (e.g., from a user via a user interface) for a particular useable version of the trained ML model and an instance type combination in response to filtering.

The trained model tuning workflow manager 202 may instruct a deployment service to deploy the useable version of the trained ML model to a compute instance having the selected instance type based on selecting the useable version of the trained ML model and the instance type combination of the filtered one or more combinations of the useable versions of the trained ML model and the different instance types. For example, upon selecting a useable version of the trained ML model and an instance type combination, the trained model tuning workflow manager 202 may instruct a deployment service to deploy the useable version of the trained ML model to a compute instance having the compute instance type of the selected combination. In some aspect, the compute instance may be a compute instance on a provider network (e.g., a virtual machine) and/or an edge device (e.g., an IoT device).

Figure 3:
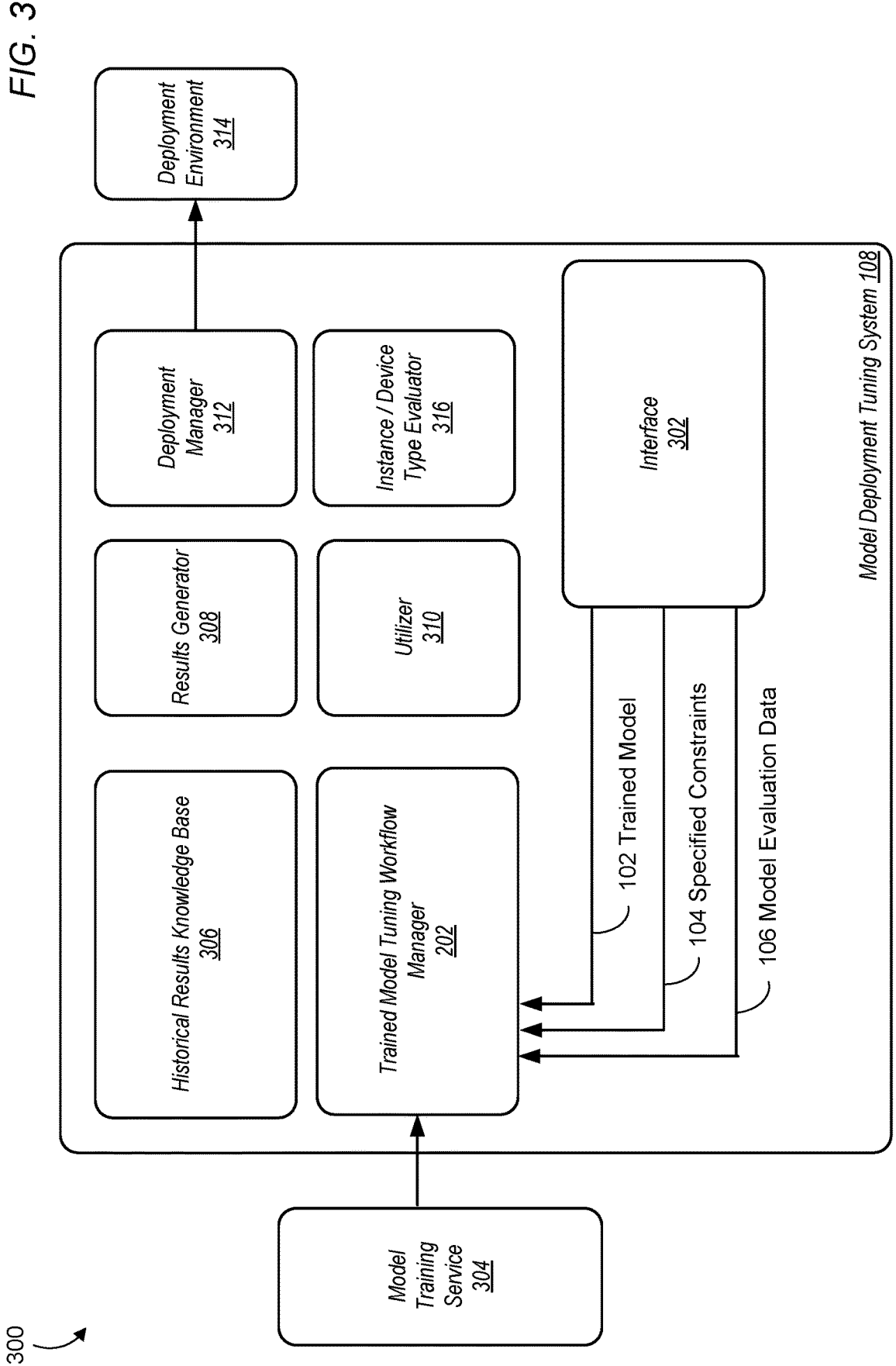
FIG. 3 illustrates an example environment including a model deployment tuning system for tuning trained models and selecting utilization techniques and compute instance types to deploy trained ML models, according to at least some embodiments.

FIG. 3 illustrates an example environment 300 including a model deployment tuning system (MDTS) 108 for tuning trained models and selecting utilization techniques and compute instance types to deploy trained ML models, according to at least some embodiments. As shown in FIG. 3, the MDTS 108 may include the trained model tuning workflow manager 202, and interface (e.g., a user-interface) 302, a historical results knowledge base 306, a results generator 306, a utilizer 310, a deployment manager 312 and a instance/device evaluator 316.

The trained model tuning workflow manager 202 may receive, from the interface 302 (e.g., a user interface) a trained ML model 102, specified constraints 104, and model evaluation data 106. In some aspects, rather than receiving the trained ML model from the interface 302, the trained model tuning workflow manager 202 may receive the trained ML model from a model training service 304 based on the a user's request. The specified constraints may include one or more model accuracy constraints, one or more model precision constraints, one or more model inference latency constraints, one or more model memory throughput constraints, one or more a model CPU utilization constraint, or one or more model GPU utilization constraints. Additionally, or alternatively, the specified constraints 104 may include a constraint on the types of computer instances on which the trained ML model may be run and/or a constraint on the types of utilization techniques that may be implemented with the trained model. Upon receiving the trained ML model 102, the specified constraints 104, and model evaluation data 106, the trained model tuning workflow manager 202 may initiate the instance type/device type evaluators 316 to run the trained ML model 102 implemented with a model utilization technique and implemented on a plurality of different compute instance types using the model evaluation data 106 and the specified constraints 104. For example, the trained model tuning workflow manager 202 may initiate the instance type/device type evaluators 316 to implement a plurality of utilization techniques from the utilizer 310 on the trained ML model 102 and execute the trained ML Model 102 for each utilization technique on a plurality of instance types. In some aspects, the trained model tuning workflow manager 202 may initiate the instance type/device type evaluators 316 to implement every utilization technique and execute each useable version of the trained ML model from each utilization technique on every instance type. In some aspects, the specified constraints and historical evaluation data from the historical results knowledge base 306 may eliminate one or more utilization techniques and/or one or more instance types thereby reducing the number of combinations of utilization techniques and instances types by which the trained ML Model 102 may be executed.

In response to the trained model tuning workflow manager 202 initiating each of the evaluators to run the trained ML model with each of the utilization technique and instance type combinations, instance type/device type evaluators 316 may run the trained ML model with each of the utilization technique and instance type combinations. The results generator 308 may provide model evaluations results to the trained model tuning workflow manager 202. In some aspect, upon receiving the model evaluation result(s) 210a, 210b, and 210n, the trained model tuning workflow manager 202 may collect the mode evaluation data into collected model evaluation results. For each useable version of the trained ML model (e.g., for each utilization technique implemented with the train ML model) and compute instance type combination, the trained model tuning workflow manager 202 may collect the recorded model evaluation results from the results generator 308 and into a matrix or table. For each useable version of the trained ML model and compute instance type combination, the trained model tuning workflow manager 202 may collect one or more of a model accuracy level (e.g., a qualitative value, a quantitative value or value range), a model precision level, a model inference latency level, a model throughput level, a model memory utilization level, a model CPU utilization level, a model GPU utilization level, and/or the like into a matrix or table and correlate the respective levels with the respective combinations.

In some aspects, the trained model tuning workflow manager 202 may filter the model evaluation results based on the one or more specified constraints to indicate one or more of the combinations of the useable versions of the trained ML model and the plurality of different compute instance types satisfying the one or more specified constraints. For example, the trained model tuning workflow manager 202 may have determined that all compute instance types of the plurality of compute instance types have been selected for the trained ML model, and then, may have collected the one or more model evaluation results from the results generator 308 for respective executed useable versions of the trained ML model for each compute instance type. For instance, for each useable version of the trained ML model and compute instance type combination, the trained model tuning workflow manager 202 may collect the recorded model evaluation results into a matrix or table. For example, for each useable version of the trained ML model and compute instance type combination, the trained model tuning workflow manager 202 may collect one or more of a model accuracy level (e.g., a qualitative value, a quantitative value or value range), a model precision level, a model inference latency level, a model throughput level, a model memory utilization level, a model CPU utilization level, a model GPU utilization level, and/or the like into a matrix or table and correlate the respective levels with the respective combinations. The trained model tuning workflow manager 202 may then filter the collected one or more model evaluation results for the respective executed usable versions of the trained ML model based on the one or more specified constraints to indicate one or more of the combinations of the useable versions of the trained ML model and the different instance types satisfying the one or more specified constraints.

As shown in element 411, the trained model tuning workflow manager 202 may generate a matrix of filtered model evaluation results. For example, upon collecting one or more of the model accuracy level (e.g., a qualitative value, a quantitative value or value range), the model precision level, the model inference latency level, the model throughput level, the model memory utilization level, the model CPU utilization level, the model GPU utilization level, and/or the like into the matrix or table, for each of the respective combinations and correlating the respective levels with the respective combinations, the trained model tuning workflow manager 202 may filter the model evaluation results. In some aspects, the trained model tuning workflow manager 202 may filter the model evaluation results by ranking the model evaluation results according to the one or more specified constraints. In some cases, the trained model tuning workflow manager 202 may then select a top-ranked combination from the plurality of useable model versions and the plurality of different compute instance types for deployment. In some aspects, the trained model tuning workflow manager 202 may filter the model evaluation results based on which utilization technique and instance type combinations for the trained ML model have a highest or a lowest model accuracy level, model precision level, model inference latency level, model throughput level, model memory utilization level, model CPU utilization level, model GPU utilization level, and/or the like. In some aspects, the trained model tuning workflow manager 202 may filter the model evaluation results based on which utilization technique and instance type combinations for the trained ML model have a highest or a lowest level for a first model evaluation result (e.g., model throughput level) while maintaining a second (and different) model evaluation result (e.g., a model accuracy level) above or below a threshold. Before and/or after filtering, the model evaluation results 212 may presented to a user via a user interface (e.g., a user interface on a device owned by the user). In some aspects, a user, via a user interface, may have a slide bar to adjust the threshold of the second model evaluation result to determine which utilization technique and instance type combinations are filtered for the trained ML model and the respective first model evaluation result when the threshold for the second model evaluation result changes.

In some aspects, the trained model tuning workflow manager 202 may receive a selection of one of the filtered model evaluation results. For example, upon filter the model evaluation results, the trained model tuning workflow manager 202 may receive a selection of a utilization technique and instance type combination for the trained ML model. In some aspects, the trained model tuning workflow manager 202 may select a useable version of the trained ML model and an instance type combination that a highest or lowest model accuracy level, model precision level, model inference latency level, model throughput level, model memory utilization level, model CPU utilization level, model GPU utilization level, and/or the like. In some aspects, the trained model tuning workflow manager 202 may select a useable version of the trained ML model and an instance type combination having a level that is highest or lowest for a first model evaluation result when a second model evaluation result is above or below a threshold (e.g., a predetermined threshold, a user-specified threshold). In some aspects, the trained model tuning workflow manager 202 may receive a selection (e.g., from a user via a user interface) for a particular useable version of the trained ML model and an instance type combination in response to filtering.

The trained model tuning workflow manager 202 may then utilize the deployment manager 312 to deploy particular usable versions of the trained ML model to the particular compute instance type corresponding to the selected filtered model evaluation result. For example, upon selecting a useable version of the trained ML model and an instance type combination, the trained model tuning workflow manager 202 may initiate the deployment manager 312 to deploy the useable version of the trained ML model to a compute instance in the deployment environment 314 having the compute instance type of the selected combination. In some aspect, the deployment environment 315 may be a provider network including the compute instance (e.g., a virtual machine) and/or an edge device.

Figure 4:
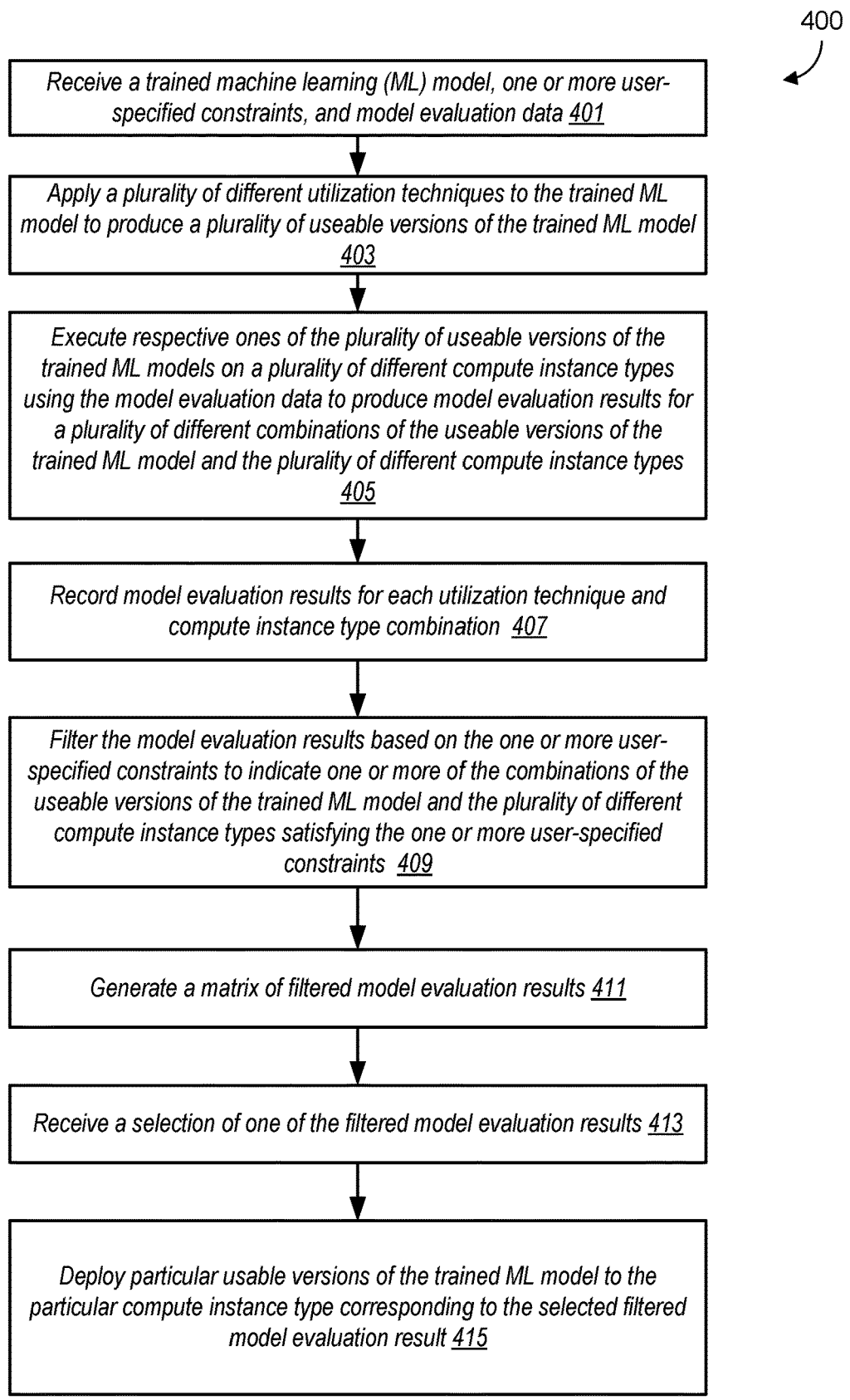
FIG. 4 is a flow diagram illustrating aspects of operations that may be performed at a model deployment tuning system to deploy trained ML models to selected compute instances for executing machine learning tasks, according to at least some embodiments.

FIG. 4 is a flow diagram 400 illustrating aspects of operations that may be performed at a model deployment tuning system (MDTS) to deploy trained ML models to selected compute instances for executing machine learning tasks, according to at least some embodiments. The flow diagram 400 may implemented with one or more of the components described in FIGS. 1-3. As shown in element 401, the MDTS may receive a trained machine learning (ML) model, one or more specified constraints, and model evaluation data. The trained ML model may be received from a user via a user-interface. Alternatively, the trained ML model may be received from an ML model training service on behalf of a user. The specified constraints may include one or more model accuracy constraints, one or more model precision constraints, one or more model inference latency constraints, one or more model memory throughput constraints, one or more a model CPU utilization constraint, or one or more model GPU utilization constraints, and/or the like. Additionally, or alternatively, the specified constraints 104 may include a constraint on the types of computer instances on which the trained ML model may be run and/or a constraint on the types of utilization techniques that may be implemented with the trained model. In some aspects, the specified constraints may be user-specified constraints received from a user, for example via a user-interface, when the MDTS is provided with the users trained ML model. Additionally, or alternatively, the specified constraints may be constraints that are previously selected for a particular user based on, for example, the particular user's history. In some aspects, the MDTS may receive a trained ML model and model evaluation data and may not receive any specified constraints. In this case, the MDTS may run iterations of utilization technique and instance type combinations for the trained ML model without any constraints (e.g., specified constraints) or using only constraints identified based on historical model evaluation data.

The model evaluation data may be data used to execute the trained ML model on a plurality of different compute instance types using a plurality of different utilization techniques. In some aspects, the model evaluation data may comprises at least one of a model evaluation script, model test data, or model verification data. For example, the MDTS may execute the model evaluation script to provide the model test data to the trained ML model and compare inference outputs from the trained ML model to the model verification data to determine one or more model evaluation results of the trained ML model. In some aspects, the model evaluation results may include a model accuracy level (e.g., a qualitative value, a quantitative value or value range), a model precision level, a model inference latency level, a model throughput level, a model memory utilization level, a model CPU utilization level, a model GPU utilization level, or the like.

As shown in element 403, the MDTS may apply a plurality of different model utilization techniques to the trained ML model to produce a plurality of useable versions of the trained ML model. Model utilization techniques for the trained ML model may include pruning techniques, weight clustering techniques, quantization techniques, or knowledge distillation techniques, or the like. In some aspects, model utilization techniques may include compression techniques.

As shown in element 405, the MDTS may execute respective ones of the plurality of useable versions of the trained ML models on a plurality of different compute instance types using the model evaluation data to produce model evaluation results for a plurality of different combinations of the useable versions of the trained ML model and the plurality of different compute instance types. Compute instance types may include features and/or capabilities of specific or particular compute resources for running the trained ML model. In some aspects, different compute instance types may include different virtual machine instance types specified based on an operating system type, a processor type, a processing capacity, a memory capacity, a GPU availability, or the like. Additionally, or alternatively, different compute instance types may include different edge device types based on an operating system type, a memory capacity, a processor type, or the like.

As shown in element 407, the MDTS may record model evaluation results for each utilization technique and compute instance type combination. For example, the MDTS may record model evaluation results including a model accuracy level (e.g., a qualitative value, a quantitative value or value range), a model precision level, a model inference latency level, a model throughput level, a model memory utilization level, a model CPU utilization level, a model GPU utilization level, or the like for each model utilization technique and compute instance type combination executed using the model evaluation data.

As shown in element 409, the MDTS may filter the model evaluation results based on the one or more specified constraints to indicate one or more of the combinations of the useable versions of the trained ML model and the plurality of different compute instance types satisfying the one or more specified constraints. For example, the MDTS may have determined that all compute instance types of the plurality of compute instance types have been selected for the trained ML model, and then, may have collected the one or more model evaluation results for respective executed useable versions of the trained ML model for each compute instance type. For instance, for each useable version of the trained ML model and compute instance type combination, the MDTS may collect the recorded model evaluation results into a matrix or table. For example, for each useable version of the trained ML model and compute instance type combination, the MDTS may collect one or more of a model accuracy level (e.g., a qualitative value, a quantitative value or value range), a model precision level, a model inference latency level, a model throughput level, a model memory utilization level, a model CPU utilization level, a model GPU utilization level, and/or the like into a matrix or table and correlate the respective levels with the respective combinations. The MDTS may then filter the collected one or more model evaluation results for the respective executed usable versions of the trained ML model based on the one or more specified constraints to indicate one or more of the combinations of the useable versions of the trained ML model and the different instance types satisfying the one or more specified constraints.

As shown in element 411, the MDTS may generate a matrix of filtered model evaluation results. For example, upon collecting one or more of the model accuracy level (e.g., a qualitative value, a quantitative value or value range), the model precision level, the model inference latency level, the model throughput level, the model memory utilization level, the model CPU utilization level, the model GPU utilization level, and/or the like into the matrix or table, for each of the respective combinations and correlating the respective levels with the respective combinations, the MDTS may filter the model evaluation results. In some aspects, the MDTS may filter the model evaluation results by ranking the model evaluation results according to the one or more specified constraints. In some cases, the MDTS may then select a top-ranked combination from the plurality of useable model versions and the plurality of different compute instance types for deployment. In some aspects, the MDTS may filter the model evaluation results based on which utilization technique and instance type combinations for the trained ML model have a highest or a lowest model accuracy level, model precision level, model inference latency level, model throughput level, model memory utilization level, model CPU utilization level, model GPU utilization level, and/or the like. In some aspects, the MDTS may filter the model evaluation results based on which utilization technique and instance type combinations for the trained ML model have a highest or a lowest level for a first model evaluation result (e.g., model throughput level) while maintaining a second (and different) model evaluation result (e.g., a model accuracy level) above or below a threshold. Before and/or after filtering, the model evaluation results 212 may presented to a user via a user interface (e.g., a user interface on a device owned by the user). In some aspects, a user, via a user interface, may have a slide bar to adjust the threshold of the second model evaluation result to determine which utilization technique and instance type combinations are filtered for the trained ML model and the respective first model evaluation result when the threshold for the second model evaluation result changes.

As shown in element 413, the MDTS may receive a selection of one of the filtered model evaluation results. For example, upon filter the model evaluation results, the MDTS may receive a selection of a utilization technique and instance type combination for the trained ML model. In some aspects, the MDTS may select a useable version of the trained ML model and an instance type combination that a highest or lowest model accuracy level, model precision level, model inference latency level, model throughput level, model memory utilization level, model CPU utilization level, model GPU utilization level, and/or the like. In some aspects, the MDTS may select a useable version of the trained ML model and an instance type combination having a level that is highest or lowest for a first model evaluation result when a second model evaluation result is above or below a threshold (e.g., a predetermined threshold, a user-specified threshold). In some aspects, the MDTS may receive a selection (e.g., from a user via a user interface) for a particular useable version of the trained ML model and an instance type combination in response to filtering.

As shown in element 415, the MDTS may deploy particular usable versions of the trained ML model to the particular compute instance type corresponding to the selected filtered model evaluation result. For example, upon selecting a useable version of the trained ML model and an instance type combination, the MDTS may deploy the useable version of the trained ML model to a compute instance having the compute instance type of the selected combination. In some aspect, the compute instance may be a compute instance on a provider network (e.g., a virtual machine) and/or an edge device (e.g., an internet of things (IoT) device).

Figure 5:
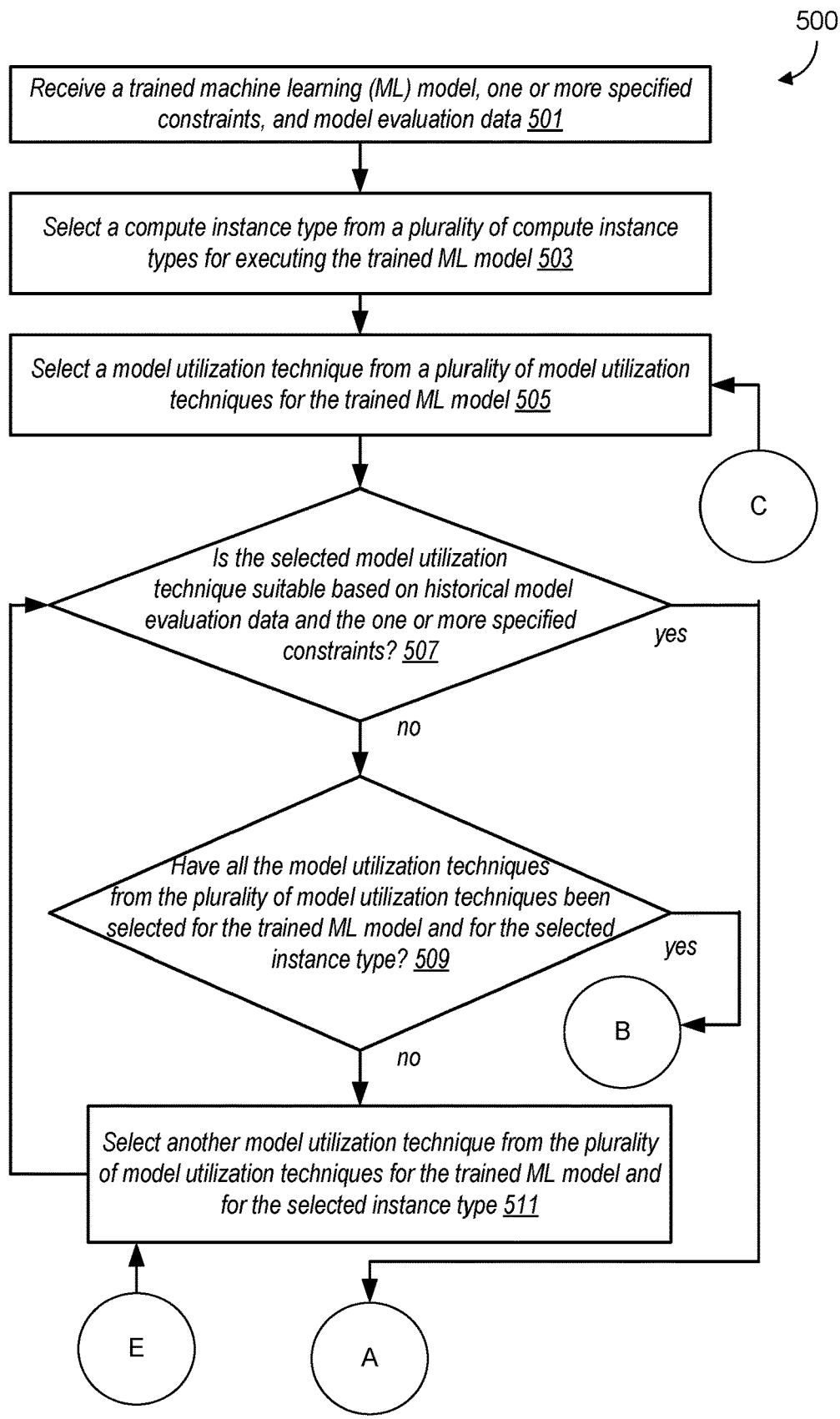
FIG. 5 is a flow diagram illustrating aspects of operations that may be performed at a model deployment tuning system to identify model utilization techniques and compute instance type combinations for determining model evaluation results for the deployment of trained ML models to execute machine learning tasks, according to at least some embodiments.
Figure 5:
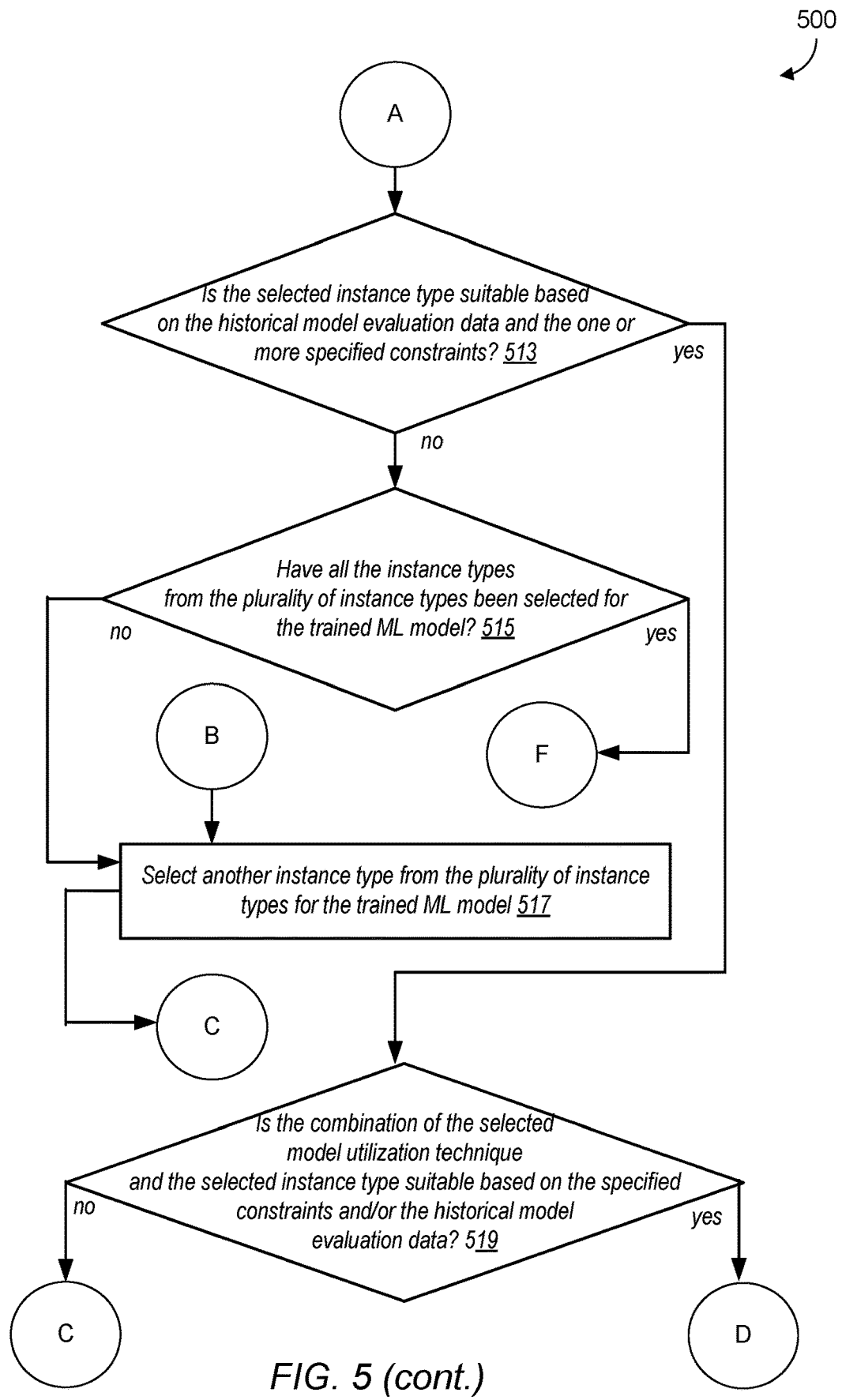
Figure 5:
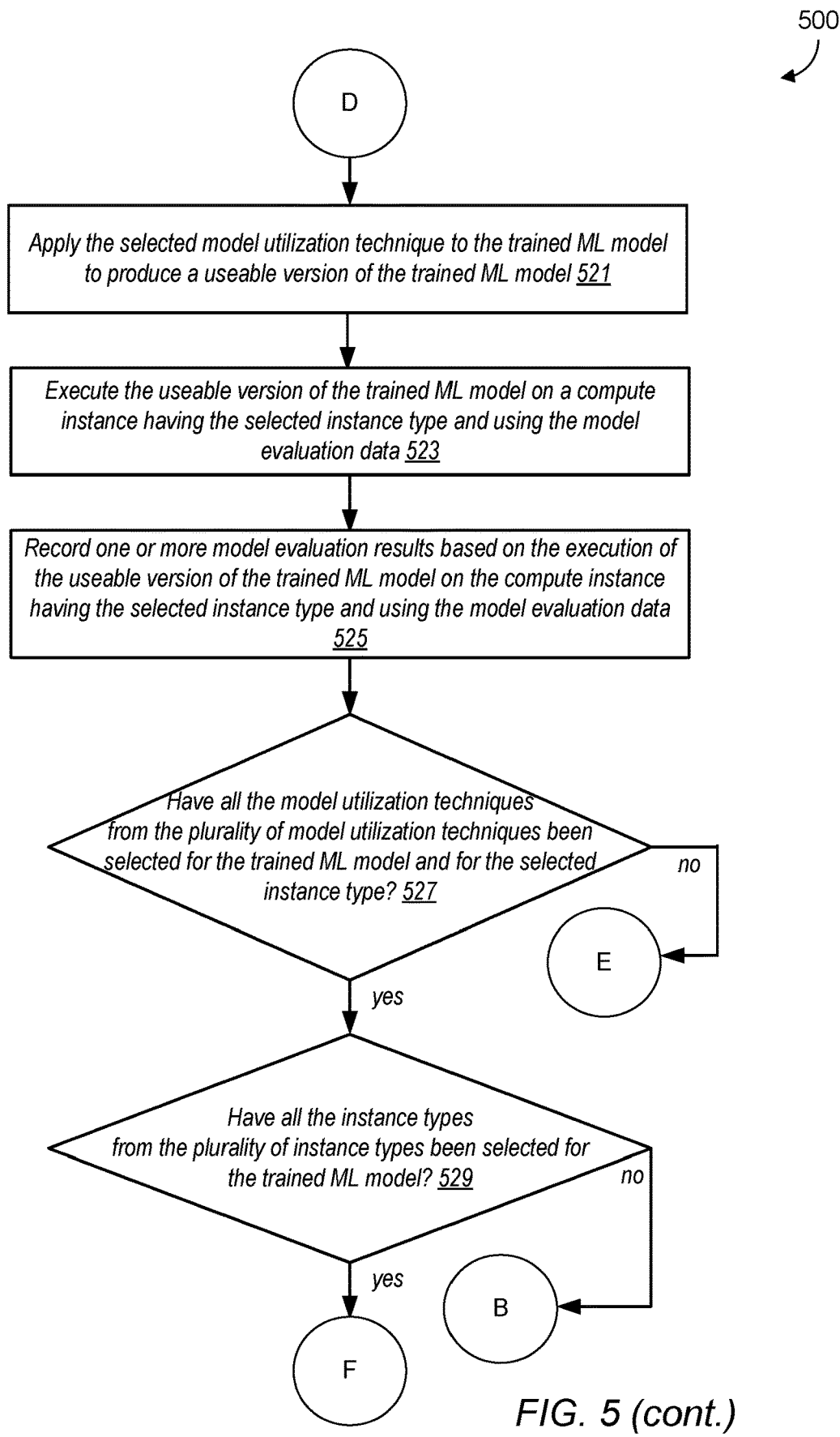
Figure 5:
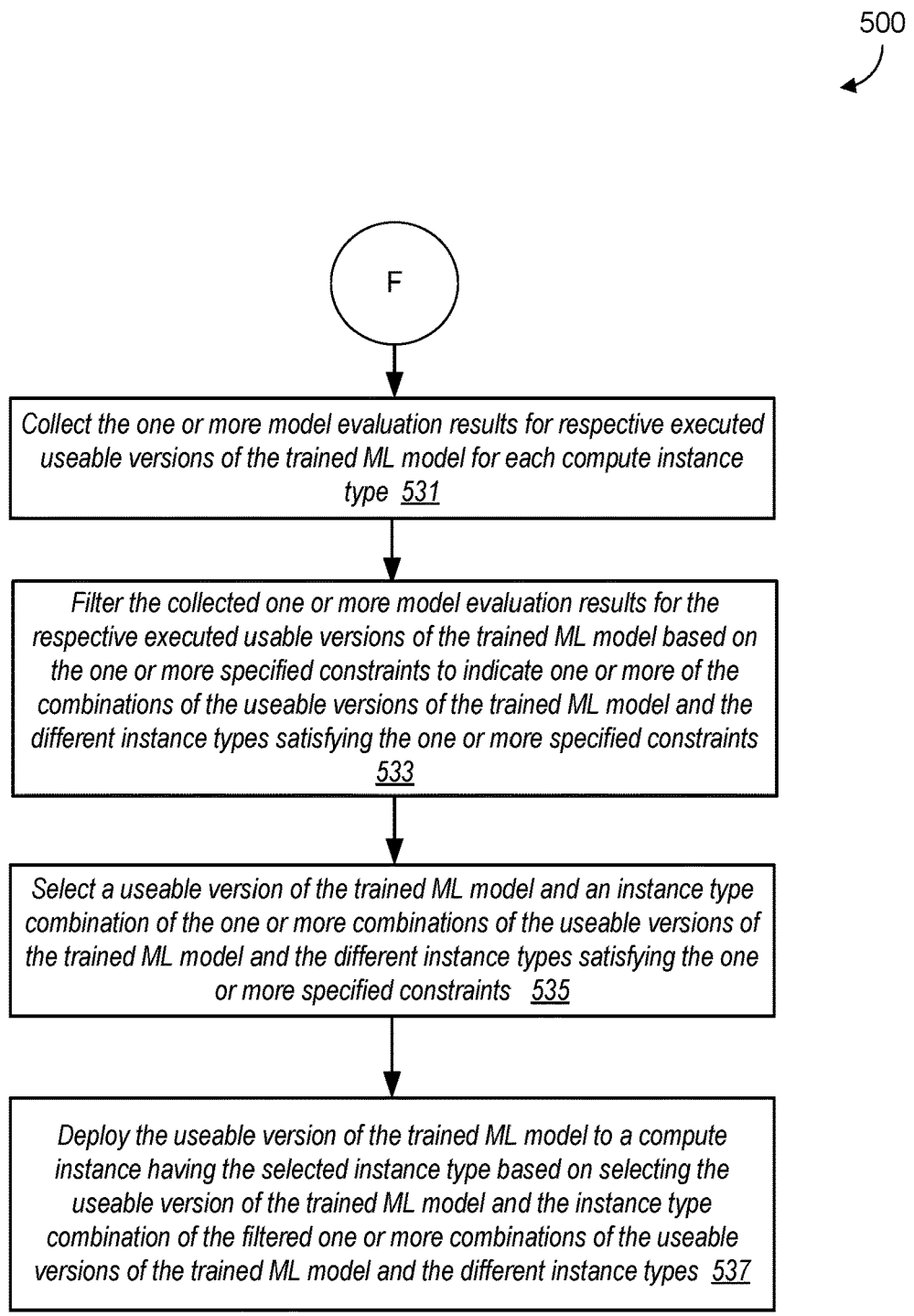

FIG. 5 is a flow diagram 500 illustrating aspects of operations that may be performed at a model deployment tuning system (MDTS) to identify model utilization techniques and compute instance type combinations for determining model evaluation results for the deployment of trained ML models to execute machine learning tasks, according to at least some embodiments. The flow diagram 500 may implemented with one or more of the components described in FIGS. 1-3 and may include one or more features described in the flow diagram 400 of FIG. 4.

As shown in element 501, the MDTS may receive a trained machine learning (ML) model, one or more specified constraints, and model evaluation data. The trained ML model may be received from a user via a user-interface. Alternatively, the trained ML model may be received from an ML model training service on behalf of a user. The one or more specified constraints may include at least one of a model accuracy constraint, a model precision constraint, a model inference latency constraint, a model throughput constraint, a model memory utilization constraint, a model CPU utilization constraint, a model GPU utilization constraint, or the like. In some aspects, the specified constraints may be user-specified constraints received from a user, for example via a user-interface, when the MDTS is provided with the users trained ML model. For example, the specified constraints may include a constraint on the types of computer instances on which the trained ML model may be run. Additionally, or alternatively, the specified constraints may be constraints that are previously selected for a particular user based on, for example, the particular user's history.

The model evaluation data may be data used to execute the trained ML model on a plurality of different compute instance types using a plurality of different utilization techniques. In some aspects, the model evaluation data may comprises at least one of a model evaluation script, model test data, or model verification data. For example, the MDTS may execute the model evaluation script to provide the model test data to the trained ML model and compare inference outputs from the trained ML model to the model verification data to determine one or more model evaluation results of the trained ML model. In some aspects, the model evaluation results may include a model accuracy level (e.g., a qualitative value, a quantitative value or value range), a model precision level, a model inference latency level, a model throughput level, a model memory utilization level, a model CPU utilization level, a model GPU utilization level, or the like.

As shown in element 503, the MDTS may select a compute instance type from a plurality of compute instance types for executing the trained ML model. As described herein, compute instance types may include features and/or capabilities of specific or particular compute resources for running the trained ML model. In some aspects, different compute instance types may include different virtual machine instance types specified based on an operating system type, a processor type, a processing capacity, a memory capacity, a GPU availability, or the like. Additionally, or alternatively, different compute instance types may include different edge device types based on an operating system type, a memory capacity, a processor type, or the like. As described herein, the MDTS may select a compute instance type for executing the trained ML model with a plurality of different model utilization techniques.

As shown in element 505, the MDTS may select a model utilization technique from a plurality of model utilization techniques for the trained ML model. Model utilization techniques for the trained ML model may include pruning techniques, weight clustering techniques, quantization techniques, or knowledge distillation techniques, or the like. In some aspects, model utilization techniques may include compression techniques. The MDTS may select a model utilization technique from a plurality of different model utilization techniques for the trained ML model for execution of the trained ML model on the selected compute instance type.

As shown in element 507, the MDTS may determine whether a selected model utilization technique is suitable based on historical model evaluation data and the one or more specified constraints. For example, the MDTS may have received previous model evaluation results of trained ML models that were the same as or similar to the received trained ML model and that were implemented with the selected model utilization technique. The previous model evaluation results may include a model accuracy level (e.g., a qualitative value, a quantitative value or value range) for a same or similar trained ML model with a same or similar model utilization technique as the selected model utilization technique, a model precision level for a same or similar trained ML model with a same or similar model utilization technique as the selected model utilization technique, a model inference latency level for a same or similar trained ML model with a same or similar model utilization technique as the selected model utilization technique, a model throughput level for a same or similar trained ML model with a same or similar model utilization technique as the selected model utilization technique, a model memory utilization level for a same or similar trained ML model with a same or similar model utilization technique as the selected model utilization technique, a model CPU utilization level for a same or similar trained ML model with a same or similar model utilization technique as the selected model utilization technique, a model GPU utilization level for a same or similar trained ML model with a same or similar model utilization technique as the selected model utilization technique, or the like. The MDTS may record the previous model evaluation results as historical model evaluation data.

The MDTS having received the historical model evaluation data may determine whether previous model evaluation results of trained ML models that were the same as or similar to the received trained ML model and that were implemented with the selected model utilization technique are suitable based on the specified constraints. The MDTS may compare the previous model evaluation results with the specified constraints to determine whether the selected model utilization technique is suitable. For example, the MDTS may compare one or more previous model evaluation results including a model accuracy level (e.g., a qualitative value, a quantitative value or value range) for the selected model utilization technique, a model precision level for the selected model utilization technique, a model inference latency level for the selected model utilization technique, a model throughput level for the selected model utilization technique, a model memory utilization level for the selected model utilization technique, a model CPU utilization level for the selected model utilization technique, a model GPU utilization level for the selected model utilization technique, or the like with one or more specified constraints including a model accuracy constraint, a model precision constraint, a model inference latency constraint, a model throughput constraint, a model memory utilization constraint, a model CPU utilization constraint, a model GPU utilization constraint, or the like, respectively. The MDTS determines whether the selected model utilization technique is suitable based on the comparison. When the MDTS determines that the selected model utilization technique is suitable, then the flow diagram proceeds to element 513, described further herein. Conversely, when the MDTS determines that the selected model utilization technique is not suitable, then the flow diagram proceeds to element 509.

At element 509, the MDTS determines whether all the model utilization techniques from the plurality of model utilization techniques have been previously been selected for the trained model and for the selected instance type. This element allows the MDTS to determine whether there are any remaining model utilization techniques to be selected for the selected model instance type or whether the MDTS is to select another model instance type from the plurality of model instance types for evaluating the trained ML model with the plurality of model utilization techniques. When the MDTS determines that all of the model utilization techniques from the plurality of model utilization techniques have been selected for the trained ML model and the selected instance type, the flow diagram proceeds to element 517. At element 517, the MDTS selects another instance type from the plurality of different instance types for the trained ML model. Then MDTS returns to element 505 to select a model utilization technique from the plurality of model utilization techniques for the trained ML model for execution on the instance type selected at element 517 and to continue to the process. When the MDTS determines that not all of the model utilization techniques from the plurality of model utilization techniques have been selected for the trained ML model and the selected instance type, the flow diagram proceeds to element 511. At element 511, the MDTS selects another model utilization type from the plurality of model utilization types for the trained ML model and the selected instance type. Then MDTS returns to element 507 to determine whether the model utilization technique selected at element 511 is suitable based on historical model evaluation data and the one or more specified constraints and to continue to the process.

As described herein, at element 507, the MDTS may determine whether a selected model utilization technique is suitable based on historical model evaluation data and the one or more specified constraints. When the MDTS determines that a selected model utilization technique is suitable, then the flow diagram proceeds to element 513. At element 513, the MDTS may determine whether the selected compute instance type is suitable based on the historical model evaluation data and the specified constraints. For example, the MDTS may have received previous model evaluation results of trained ML models that were the same as or similar to the received trained ML model and that were implemented with the selected compute instance type. The compute instance type may be from a plurality of different virtual machine instance types specified in terms of operating system type, processor type, processing capacity, memory capacity, GPU availability, or the like. Additionally, or alternatively, the compute instance type may be from a plurality of different edge device types specified in terms of operating system type, memory capacity, processor type, or the like. The MDTS may record the previous model evaluation results as historical model evaluation data.

The MDTS having received the historical model evaluation data may determine whether previous model evaluation results of trained ML models that were the same as or similar to the received trained ML model and that were implemented with the selected compute instance type are suitable based on the specified constraints. The MDTS may compare the previous model evaluation results with the specified constraints to determine whether the selected compute instance type is suitable. For example, the MDTS may compare one or more previous model evaluation results including different virtual machine instance types specified in terms of operating system type, processor type, processing capacity, memory capacity, GPU availability, or the like and/or different edge device types specified in terms of operating system type, memory capacity, processor type, or the like with one or more specified constraints including a specified virtual machine operating system type, a specified virtual machine processor type, a specified virtual machine processing capacity, a specified virtual machine memory capacity, a specified virtual machine GPU availability, a specified edge device operating system type, a specified edge device memory capacity, a specified edge device processor type, or the like, respectively. The MDTS determines whether the selected compute instance type is suitable based on the comparison. When the MDTS determines that the selected compute instance type is suitable, then the flow diagram proceeds to element 519, described further herein. Conversely, when the MDTS determines that the selected compute instance type is not suitable, then the flow diagram proceeds to element 515.

At element 515, the MDTS determines whether all the compute instance types from the plurality of compute instance types have been previously been selected for the trained model. This element allows the MDTS to determine whether there are any remaining compute instance types to be selected for the trained ML model or whether the MDTS is to collect all the model evaluation results for respective executed usable versions of the trained ML model. When the MDTS determines that all of the compute instance types from the plurality of compute instance types have been selected for the trained ML model, the flow diagram proceeds to element 531. At element 531, the MDTS collects the model evaluation results for respective executed useable versions of the trained ML model, as described herein. When the MDTS determines that not all of the compute instance types from the plurality of compute instance types have been selected for the trained ML model, the flow diagram proceeds to element 517. At element 517, the MDTS selects another instance type from the plurality of different instance types for the trained ML model. Then MDTS returns to element 505 to select a model utilization technique from the plurality of model utilization techniques for the trained ML model for execution on the instance type selected at element 517 and to continue to the process.

As described herein, at element 515, the MDTS may determine whether a selected compute instance type is suitable based on historical model evaluation data and the one or more specified constraints. When the MDTS determines that a selected compute instance type is suitable, then the flow diagram proceeds to element 519. At element 519, the MDTS may determine whether the selected model utilization technique and the selected compute instance type combination is suitable based on the historical model evaluation data and the specified constraints. For example, the MDTS may have received previous model evaluation results of trained ML models that were the same as or similar to the received trained ML model and that were implemented with the selected model utilization technique and the selected compute instance type combination. The previous model evaluation results may include a model accuracy level (e.g., a qualitative value, a quantitative value or value range) for the combination, a model precision level for the combination, a model inference latency level for combination, a model throughput level for the combination, a model memory utilization level for the combination, a model CPU utilization level for the combination, a model GPU utilization level for the combination, or the like. The MDTS may record the previous model evaluation results as historical model evaluation data.

The MDTS having received the historical model evaluation data may determine whether previous model evaluation results of trained ML models for the combination are suitable based on the specified constraints. The MDTS may compare the previous model evaluation results with the specified constraints to determine whether the selected combination is suitable. For example, the MDTS may compare one or more previous model evaluation results including a model accuracy level (e.g., a qualitative value, a quantitative value or value range) for the selected combination, a model precision level for the selected combination, a model inference latency level for the selected combination, a model throughput level for the selected combination, a model memory utilization level for the selected combination, a model CPU utilization level for the selected combination, a model GPU utilization level for the selected combination, or the like with one or more specified constraints including a model accuracy constraint, a model precision constraint, a model inference latency constraint, a model throughput constraint, a model memory utilization constraint, a model CPU utilization constraint, a model GPU utilization constraint, or the like, respectively. The MDTS determines whether the selected combination is suitable based on the comparison. When the MDTS determines that the selected combination is suitable, then the flow diagram proceeds to element 521, described further herein. Conversely, when the MDTS determines that the selected combination is not suitable, then the flow diagram proceeds to element 505.

It should be understood that, as described herein, element 519 may be used in conjunction with elements 507 and 513. In some instances, element 519 may be used for redundancy to ensure that executed trained ML models meet criteria specified in the specified constraints. In some aspects, element 519 may catch unexpected results. For example, the MDTS may determine that a selected compute instance type, by itself, and a selected model utilization technique, by itself, are each suitable, as described herein. However, the MDTS, using element 519, may determine that the combination of the selected compute instance type and the selected model utilization technique is not suitable, and thus avoid providing and/or further processing substandard model evaluation results. In some instances, element 519 may used in lieu of elements 507 and 513, for example, when only a small quantity of model utilization techniques and/or a small quantity of compute instance types are specified in the specified constraints.

As described herein, at element 519, the MDTS may determine whether the selected model utilization technique and the selected compute instance type combination is suitable based on the historical model evaluation data and the specified constraints. When the MDTS determines that the selected combination is suitable, then the flow diagram proceeds to element 521. At element 521, the MDTS may apply the selected model utilization technique to the trained ML model to produce a useable version of the trained ML model. At element 523, the MDTS may execute the useable version of the trained ML model on a compute instance having the selected compute instance type and using the model evaluation data.

At element 525, the MDTS may record one or more model evaluation results based on the execution of the useable version of the trained ML model on the compute instance having the selected instance type and using the model evaluation data. For example, the MDTS may record, for example, into a database and/or an electronic memory storage, a model accuracy level (e.g., a qualitative value, a quantitative value or value range), a model precision level, a model inference latency level, a model throughput level, a model memory utilization level, a model CPU utilization level, a model GPU utilization level, and/or the like.

At element 527, the MDTS may determine whether all the model utilization techniques from the plurality of model utilization techniques have been selected for the trained ML model and for the selected instance type. When the MDTS determines that not all the model utilization techniques from the plurality of model utilization techniques have been selected for the trained ML model and for the selected instance type, then process proceeds to element 511 so that the MDTS may select another model utilization technique from the plurality of model utilization techniques for the trained ML model and for the selected instance type. When the MDTS determines that all the model utilization techniques from the plurality of model utilization techniques have been selected for the trained ML model and for the selected instance type, then, at element 529, the MDTS may determine whether all compute instance types of the plurality of compute instance types have been selected for the trained ML model. When the MDTS determines that not all compute instance types of the plurality of compute instance types have been selected for the trained ML model, then process proceeds to element 517 so that the MDTS may select another compute instance type from the plurality of compute instance types for the trained ML model.

When the MDTS determines that all compute instance types of the plurality of compute instance types have been selected for the trained ML model, then, at element 531, the MDTS may collect the one or more model evaluation results for respective executed useable versions of the trained ML model for each compute instance type. For instance, for each useable version of the trained ML model and compute instance type combination, the MDTS may collect the recorded model evaluation results into a matrix or table. For example, for each useable version of the trained ML model and compute instance type combination, the MDTS may collect one or more of a model accuracy level (e.g., a qualitative value, a quantitative value or value range), a model precision level, a model inference latency level, a model throughput level, a model memory utilization level, a model CPU utilization level, a model GPU utilization level, and/or the like into a matrix or table and correlate the respective levels with the respective combinations.

At element 533, the MDTS may filter the collected one or more model evaluation results for the respective executed usable versions of the trained ML model based on the one or more specified constraints to indicate one or more of the combinations of the useable versions of the trained ML model and the different instance types satisfying the one or more specified constraints. For example, upon collecting one or more of the model accuracy level (e.g., a qualitative value, a quantitative value or value range), the model precision level, the model inference latency level, the model throughput level, the model memory utilization level, the model CPU utilization level, the model GPU utilization level, and/or the like into the matrix or table, for each of the respective combinations and correlating the respective levels with the respective combinations, the MDTS may filter the model evaluation results. In some aspects, the MDTS may filter the model evaluation results based on which utilization technique and instance type combinations for the trained ML model have a highest or a lowest model accuracy level, model precision level, model inference latency level, model throughput level, model memory utilization level, model CPU utilization level, model GPU utilization level, and/or the like. In some aspects, the MDTS may filter the model evaluation results based on which utilization technique and instance type combinations for the trained ML model have a highest or a lowest level for a first model evaluation result (e.g., model throughput level) while maintaining a second (and different) model evaluation result (e.g., a model accuracy level) above or below a threshold. In some aspects, a user, via a user interface, may have a slide bar to adjust the threshold of the second model evaluation result to determine which utilization technique and instance type combinations are filtered for the trained ML model and the respective first model evaluation result when the threshold for the second model evaluation result changes.

At element 535, the MDTS may select a useable version of the trained ML model and an instance type combination of the one or more combinations of the useable versions of the trained ML model and the different instance types satisfying the one or more specified constraints. For example, upon filter the model evaluation results, the MDTS may receive a selection of a utilization technique and instance type combination for the trained ML model. In some aspects, the MDTS may select a useable version of the trained ML model and an instance type combination that a highest or lowest model accuracy level, model precision level, model inference latency level, model throughput level, model memory utilization level, model CPU utilization level, model GPU utilization level, and/or the like. In some aspects, the MDTS may select a useable version of the trained ML model and an instance type combination having a level that is highest or lowest for a first model evaluation result when a second model evaluation result is above or below a threshold (e.g., a predetermined threshold, a user-specified threshold). In some aspects, the MDTS may receive a selection (e.g., from a user via a user interface) for a particular useable version of the trained ML model and an instance type combination in response to filtering.

At element 537, the MDTS may deploy the useable version of the trained ML model to a compute instance having the selected instance type based on selecting the useable version of the trained ML model and the instance type combination of the filtered one or more combinations of the useable versions of the trained ML model and the different instance types. For example, upon selecting a useable version of the trained ML model and an instance type combination, the MDTS may deploy the useable version of the trained ML model to a compute instance having the compute instance type of the selected combination. In some aspect, the compute instance may be a compute instance on a provider network (e.g., a virtual machine) and/or an edge device (e.g., an IoT device).

Figure 6:
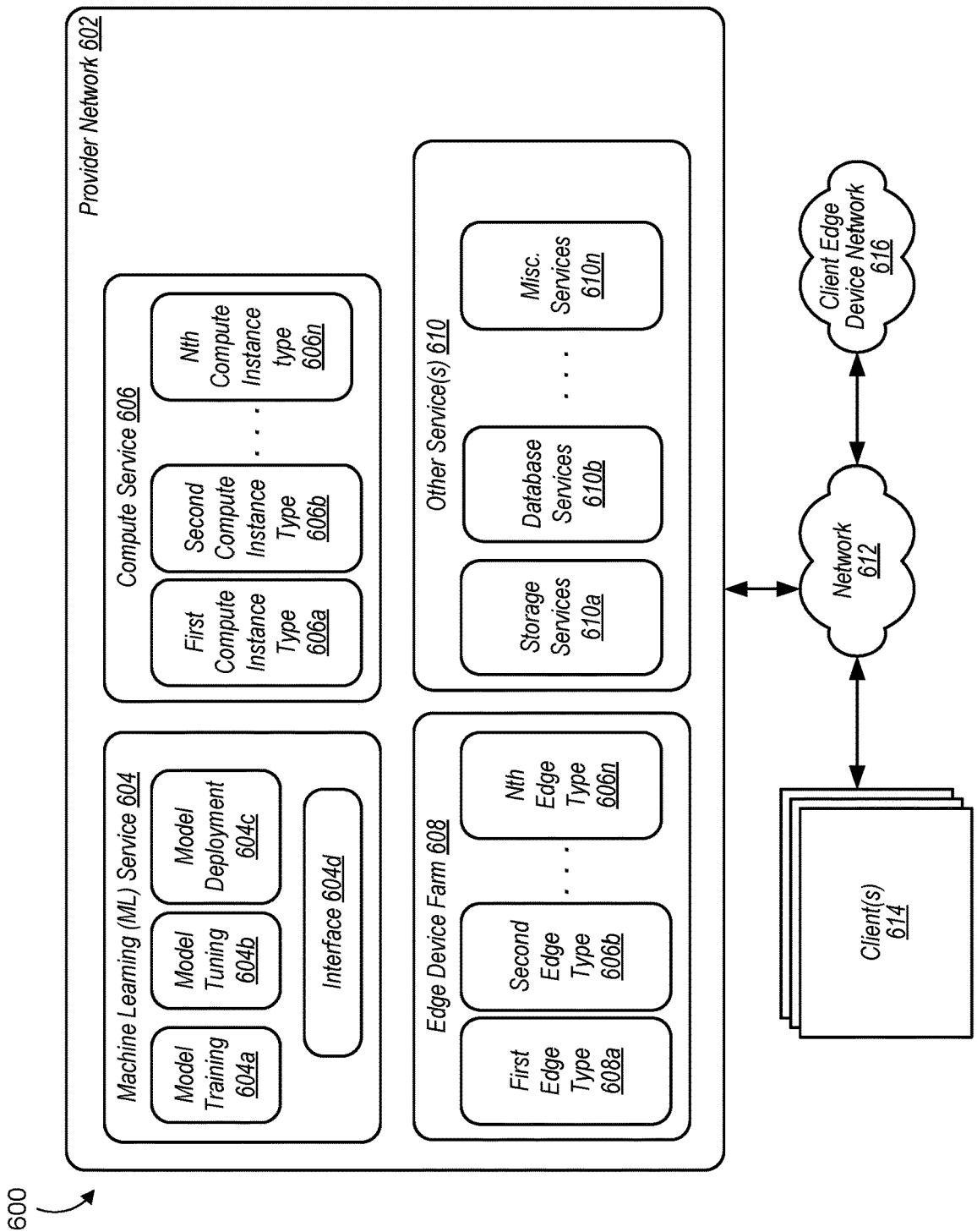
FIG. 6 illustrates example environment including a provider network for utilizing and deploying trained ML models, according to at least some embodiments.

FIG. 6 illustrates example environment 600 including a provider network 602 for utilizing and deploying trained ML models, according to at least some embodiments. As shown in FIG. 6, the provider network 602 may include a machine learning service (MLS) 604, a compute service 606, an edge device farm 608, and other service(s) 610. The other service(s) 610 may include storage services 610a, database services 610b, and/or other miscellaneous service 610n. The ML service 604 may include a model training service 604a, a model tuning service 604b, a model deployment service 604c, and an interface 604d. The model training service 604a may be used to train ML models. For example, a client 614, via the network 612 and the interface 604d (e.g., a user-interface) may provide an ML model and request that the model training service 604a train the ML models.

The model tuning service 604b may receive trained ML models and identify one or more model utilization technique and compute instances type combinations based on specified constraints and/or historical model evaluation data as described herein. For example, the model tuning system 604b may receive from a client 614, via the network 612, and/or from the model training service 604a a trained ML model and identify one or more model utilization technique and compute instances type combinations based on specified constraints and/or historical model evaluation data as described herein. For example, the model deployment service 604c may identify a plurality of compute instance types from the compute service 606 including a first compute instance type 606a, a second compute instance type 606b, and through an Nth compute instance type 606n. As another example, the model deployment service 604c may identify a plurality of edge device types from the edge device farm 608 including a first edge device type 608a, a second edge device type 608b, and through an Nth edge device type 608n. Upon a selection of one model utilization technique and compute instance type/edge device type combination, the model deployment service 604c may deploy a usable version of the trained ML model with the selected model utilization technique and a selected compute instance (e.g., a resource) having the selected compute instance type/edge device type located in the network 612 or the client edge device network 616.

Figure 7:
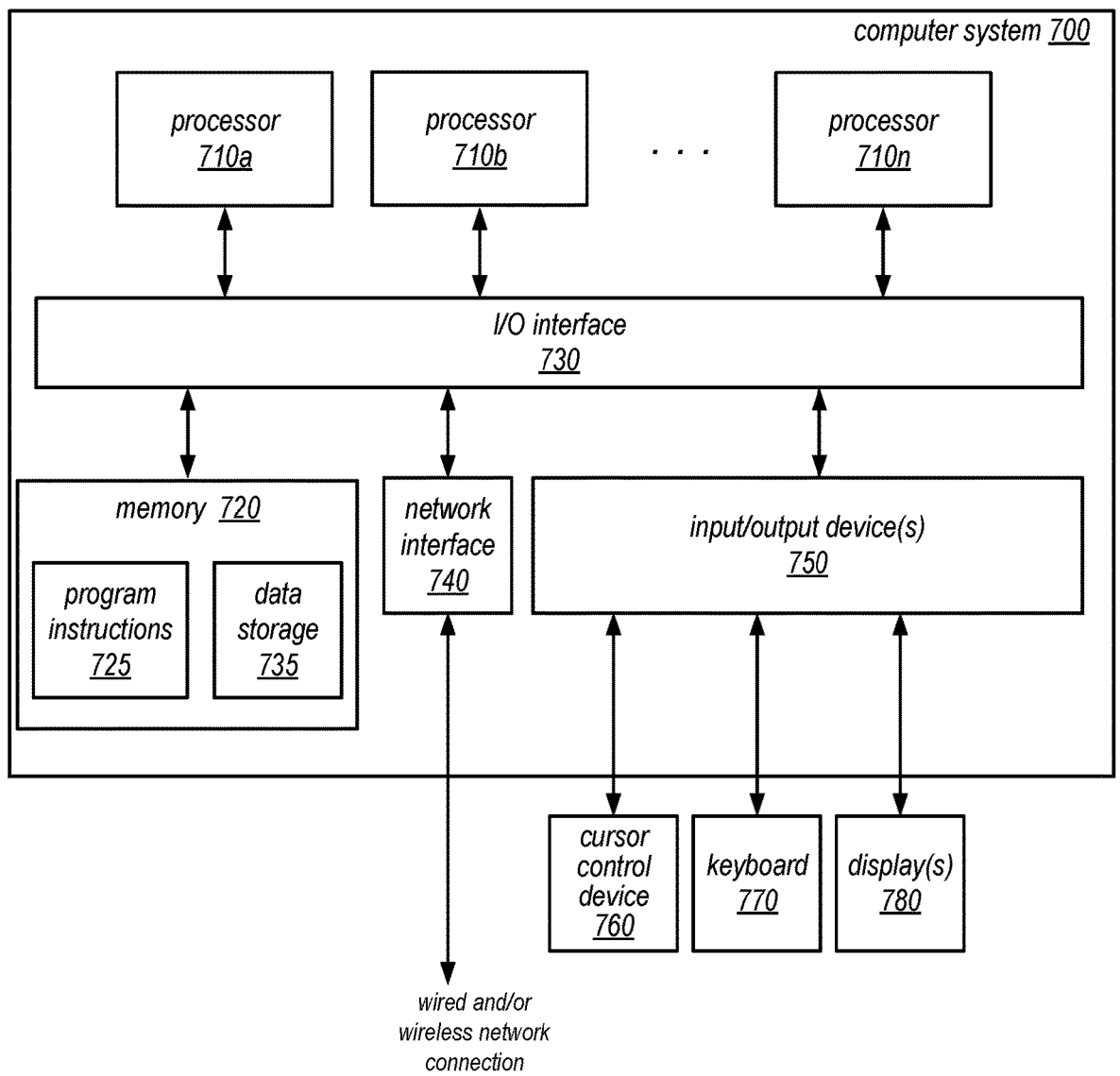
FIG. 7 is a block diagram illustrating an example computing device that may be used in at least some embodiments.

In at least some embodiments, a server that implements the types of techniques described herein (e.g., various functions of an MLS, MDTS, or other services of a provider network), may include a general-purpose computer system that includes or is configured to access one or more computer-accessible media. FIG. 7 illustrates such a general-purpose computing device 700. In the illustrated embodiment, computing device 700 includes one or more processors 710 coupled to a system memory 720 (which may comprise both non-volatile and volatile memory modules) via an input/output (I/O) interface 730. Computing device 700 further includes a network interface 740 coupled to I/O interface 730.

In various embodiments, computing device 700 may be a uniprocessor system including one processor 710, or a multiprocessor system including several processors 710 (e.g., two, four, eight, or another suitable number). Processors 710 may be any suitable processors capable of executing instructions. For example, in various embodiments, processors 710 may be general-purpose or embedded processors implementing any of a variety of instruction set architectures (ISAs), such as the x86, PowerPC, SPARC, ARM, or MIPS ISAs, or any other suitable ISA. In multiprocessor systems, each of processors 710 may commonly, but not necessarily, implement the same ISA. In some implementations, graphics processing units (GPUs) and or field-programmable gate arrays (FPGAs) may be used instead of, or in addition to, conventional processors.

System memory 720 may be configured to store instructions and data accessible by processor(s) 710. In at least some embodiments, the system memory 720 may comprise both volatile and non-volatile portions; in other embodiments, only volatile memory may be used. In various embodiments, the volatile portion of system memory 720 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 720 as code 725 and data 726.

In one embodiment, I/O interface 730 may be configured to coordinate I/O traffic between processor 710, system memory 720, and any peripheral devices in the device, including network interface 740 or other peripheral interfaces such as various types of persistent and/or volatile storage devices. In some embodiments, I/O interface 730 may perform any necessary protocol, timing or other data transformations to convert data signals from one component (e.g., system memory 720) into a format suitable for use by another component (e.g., processor 710). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components, such as a north bridge and a south bridge, for example. Also, in some embodiments some or all of the functionality of I/O interface 730, such as an interface to system memory 720, may be incorporated directly into processor 710.

Network interface 740 may be configured to allow data to be exchanged between computing device 700 and other devices 760 attached to a network or networks 750, such as other computer systems or devices as illustrated in FIG. 1 through FIG. 6, for example. In various embodiments, network interface 740 may support communication via any suitable wired or wireless general data networks, such as types of Ethernet network, for example. Additionally, network interface 740 may support communication via telecommunications/telephony networks such as analog voice networks or digital fiber communications networks, via storage area networks such as Fibre Channel SANs, or via any other suitable type of network and/or protocol.

In some embodiments, system memory 720 may represent one embodiment of a computer-accessible medium configured to store at least a subset of program instructions and data used for implementing the methods and apparatus discussed in the context of FIG. 1 through FIG. 6. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 700 via I/O interface 730. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 700 as system memory 720 or another type of memory. In some embodiments, a plurality of non-transitory computer-readable storage media may collectively store program instructions that when executed on or across one or more processors implement at least a subset of the methods and techniques described above. A computer-accessible medium may further include transmission media or signals such as electrical, electromagnetic, or digital signals, conveyed via a communication medium such as a network and/or a wireless link, such as may be implemented via network interface 740. Portions or all of multiple computing devices such as that illustrated in FIG. 7 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
one or more computers comprising respective processors and memory configured to implement a machine learning (ML) model tuning and deployment system configured to:
responsive to a user request to tune a trained ML model for deployment:
receive the trained ML model, one or more specified constraints, and model evaluation data,
identify a plurality of model utilization techniques, including at least one ML model compression technique, for the trained ML model,
identify a plurality of different compute instance types having different resource capabilities for executing the trained ML model using the plurality of model utilization techniques,
apply the plurality of model utilization techniques, including the at least one ML model compression technique, to the trained ML model to produce a plurality of useable model versions of the trained ML model having at least one of different model sizes or different performance levels as a result of applying the plurality of model utilization techniques, and
execute respective ones of the plurality of useable model versions of the trained ML models having at least one of the different model sizes or the different performance levels on a plurality of different compute instance types having the different resource capabilities using the model evaluation data to produce model evaluation results for a plurality of different combinations of the useable model versions of the trained ML model having at least one of the different model sizes or the different performance levels and the plurality of different compute instance types having the different resource capabilities, and
filter the model evaluation results based on the one or more specified constraints to indicate one or more combinations of the useable model versions of the trained ML model and the different compute instance types satisfying the one or more specified constraints; and
deploy one of the plurality of useable model versions of the trained ML model to one of the plurality of different compute instance types according to a selected one of the one or more combinations of the useable model versions and different compute instance types satisfying the one or more specified constraints.

2. The system as recited in claim 1, wherein the plurality of model utilization techniques comprises at least one of a pruning technique, a weight clustering technique, a quantization technique, or a knowledge distillation technique.

3. The system as recited in claim 1, wherein the one or more specified constraints comprises at least one of:
a model accuracy constraint,
a model precision constraint,
a model inference latency constraint,
a model memory throughput constraint,
a model utilization technique type constraint,
a compute instance type constraint,
a model size constraint,
a model CPU utilization constraint, or
a model GPU utilization constraint.

4. The system as recited in claim 1, wherein:
the plurality of different compute instance types comprise a plurality of different virtual machine instance types specified in terms of operating system type, processor type, processing capacity, memory capacity, or GPU availability; or
the plurality of different compute instance types comprise a plurality of different edge device types specified in terms of operating system type, memory capacity, or processor type.

5. The system as recited in claim 1, further comprising:
after identifying the plurality of model utilization techniques, including at least one compression technique, for the trained ML model, eliminating at least one of one or more of the model utilization techniques from the plurality of model utilization techniques based at least in part on the one or more specified constraints or historical evaluation data for other trained ML models to which the plurality of model utilization techniques have been previously applied; and
after identifying the plurality of different compute instance types for executing the trained ML model using the plurality of model utilization techniques, eliminating at least one of one or more compute instance types from the plurality of different compute instance types based at least in part on the one or more specified constraints or the historical evaluation data for the other trained ML models which have previously been evaluated on the plurality of different compute instance types.

6. A computing-implemented method comprising:
responsive to a user request to tune a trained ML model for deployment:
receiving a trained machine learning (ML) model and model evaluation data,
applying a plurality of model utilization techniques to the trained ML model to produce a plurality of useable model versions of the trained ML model having at least one of different model sizes or different performance levels,
executing respective ones of the plurality of useable model versions of the trained ML models on a plurality of different compute instance types having different resource capabilities using the model evaluation data to produce model evaluation results for a plurality of different combinations of the useable model versions of the trained ML model and the plurality of different compute instance types, and
generating the model evaluation results to indicate one or more of the different combinations of the useable model versions of the trained ML model having at least one of the different model sizes or the different performance levels and the plurality of different compute instance types having the different resource capabilities; and
deploying one of the plurality of useable model versions of the trained ML model to one of the plurality of different compute instance types according to a selected one of the different combinations of the useable model versions and different compute instance types.

7. The method as recited in claim 6, further comprising:
when receiving the trained machine learning (ML) model and the model evaluation data, receiving one or more specified constraints.

8. The method as recited in claim 7, wherein generating the model evaluation results comprises:
filtering the model evaluation results based on the one or more specified constraints to indicate one or more of the different combinations of the useable model versions of the trained ML model and the plurality of different compute instances types satisfying the one or more specified constraints.

9. The method as recited in claim 8, wherein filtering the model evaluation results comprises ranking the model evaluation results according to the one or more specified constraints and selecting a top-ranked combination from the plurality of useable model versions and the plurality of different compute instance types for deployment.

10. The method as recited in claim 6, further comprising:
before deploying the one of the plurality of useable model versions, recording performance data for the one of the plurality of useable model versions.

11. The method as recited in claim 10, wherein the performance data comprises at least one an inference accuracy or an inference latency.

12. The method as recited in claim 6, further comprising:
after generating, transmitting the model evaluation results indicating the one or more combinations of the useable model versions and compute instance types to a user destination; and
receiving a user input selecting one of the combinations of the useable model versions and compute instance types for deployment.

13. The method as recited in claim 6, wherein receiving the trained ML model comprises receiving the trained ML model from a user.

14. The method as recited in claim 6, wherein receiving the trained ML model comprises receiving the trained ML model from an ML model training service on behalf of a user.

15. A non-transitory, computer-readable storage medium storing one or more electronically executable program instructions that, when executed by one or more processors, cause the one or more processors to:
responsive to a user request to tune a trained ML model for deployment:
receive a trained machine learning (ML) model and model evaluation data,
apply a plurality of model utilization techniques to the trained ML model to produce a plurality of useable model versions of the trained ML model having at least one of different model sizes or different performance levels,
execute respective ones of the plurality of useable model versions of the trained ML models on a plurality of different compute instance types having different resource capabilities using the model evaluation data to produce model evaluation results for a plurality of different combinations of the useable model versions of the trained ML model and the plurality of different compute instance types, and generate the model evaluation results to indicate one or more of the different combinations of the useable model versions of the trained ML model having at least one of the different model sizes or the different performance levels, and the plurality of different compute instance types having the different resource capabilities; and deploy one of the plurality of useable model versions of the trained ML model to one of the plurality of different compute instance types according to a selected one of the different combinations of the useable model versions and different compute instance types.

16. The non-transitory, computer-readable storage medium as recited in claim 15, further comprising:

when receiving the trained machine learning (ML) model and the model evaluation data, receiving one or more specified constraints.

17. The non-transitory, computer-readable storage medium as recited in claim 16, wherein generating the model evaluation results comprises:

filtering the model evaluation results based on the one or more specified constraints to indicate one or more of the different combinations of the useable model versions of the trained ML model and the plurality of different compute instances types satisfying the one or more specified constraints.

18. The non-transitory, computer-readable storage medium as recited in claim 17, wherein the selected one of the different combinations of the useable model versions and the different compute instance types satisfying the one or more specified constraints is selected based on at least one a highest rating or a lowest rating for a particular specified constraint of the one or more specified constraints.

19. The non-transitory, computer-readable storage medium as recited in claim 16, wherein the particular specified constraint comprises a user-selected specified constraint.

20. The non-transitory, computer-readable storage medium as recited in claim 15, wherein the model evaluation data comprises at least one of a model evaluation script, model test data, or model verification data, and wherein the model evaluation script is executable to provide the model test data to the trained ML model and compare inference outputs from the trained ML model to the model verification data to evaluate an accuracy of the trained ML model.

* * * * *